A. O. TATE.
MACHINE FOR WATERPROOFING FIBROUS MATERIALS.
APPLICATION FILED FEB. 20, 1915.
1,215,077.
Patented Feb. 6, 1917.
9 SHEETS—SHEET 9.
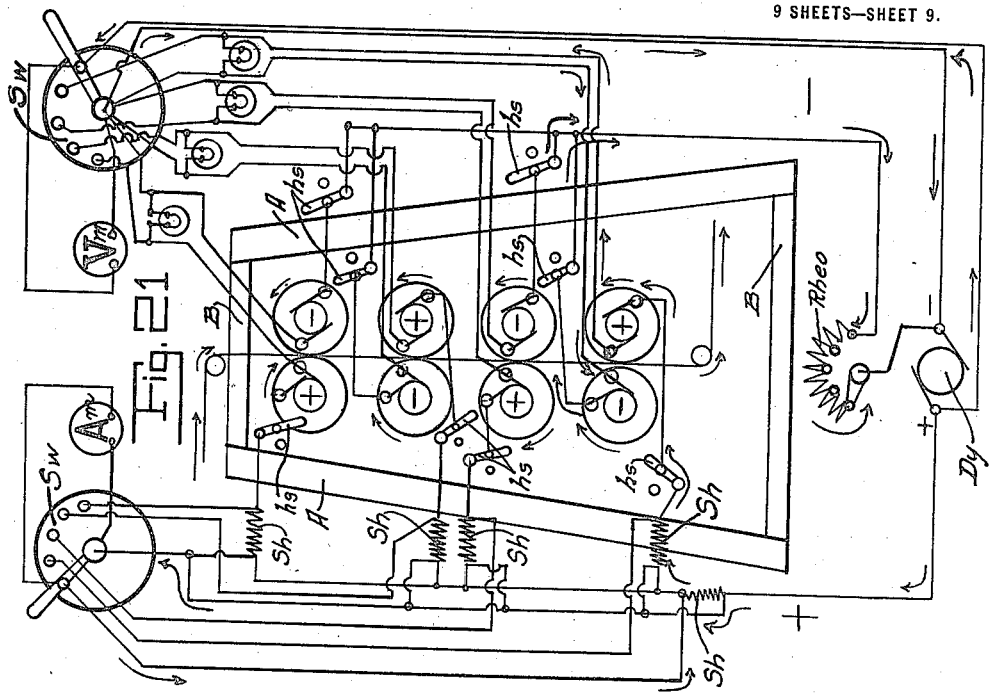
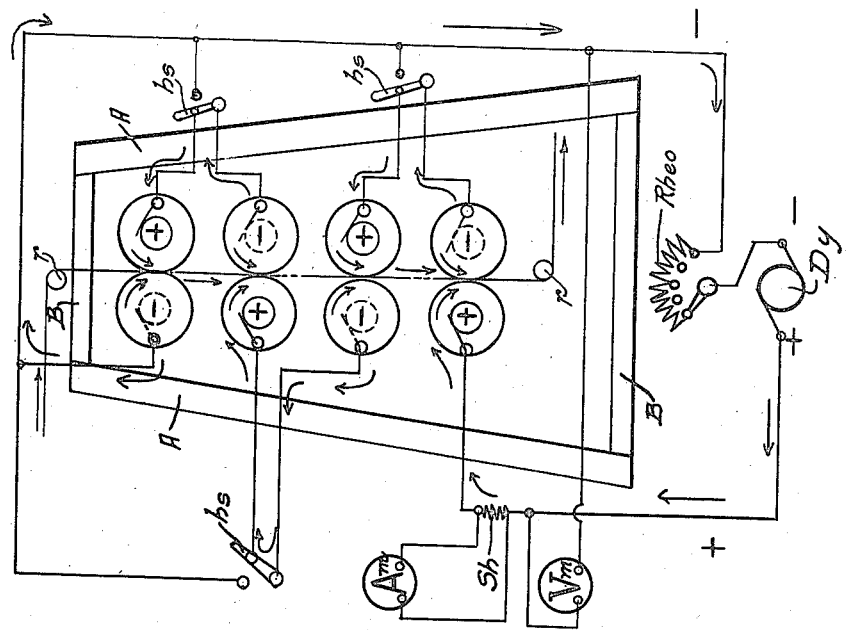

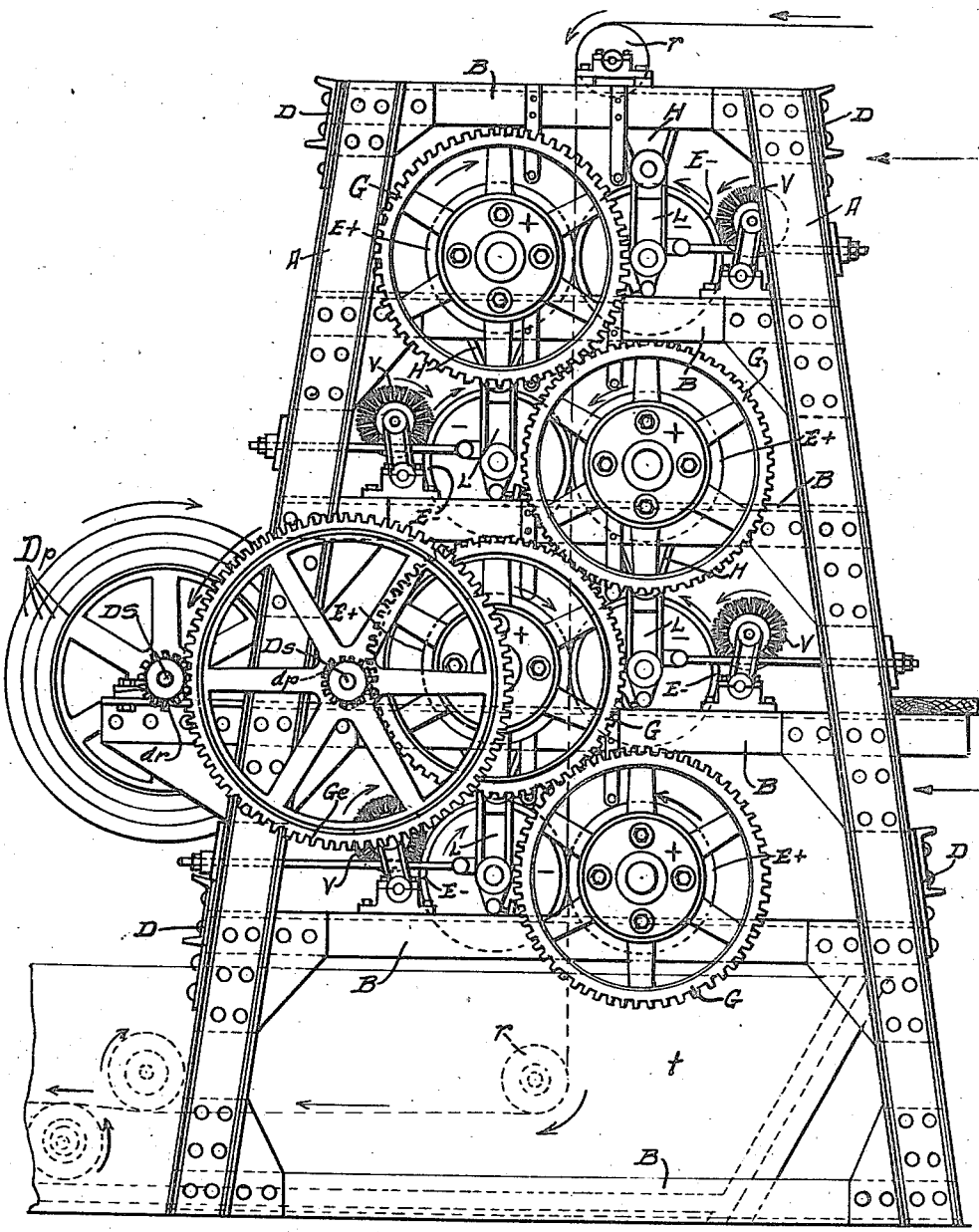

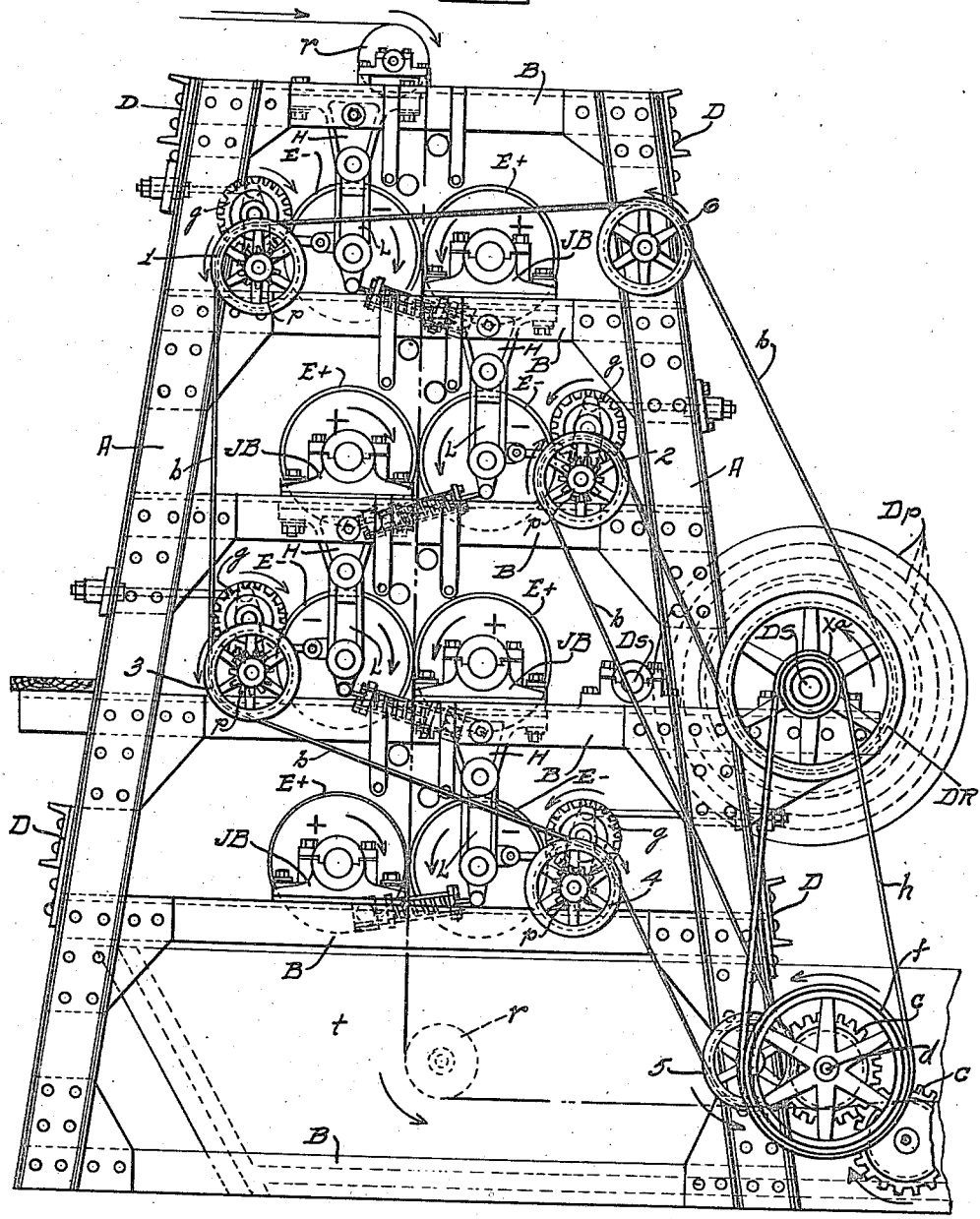

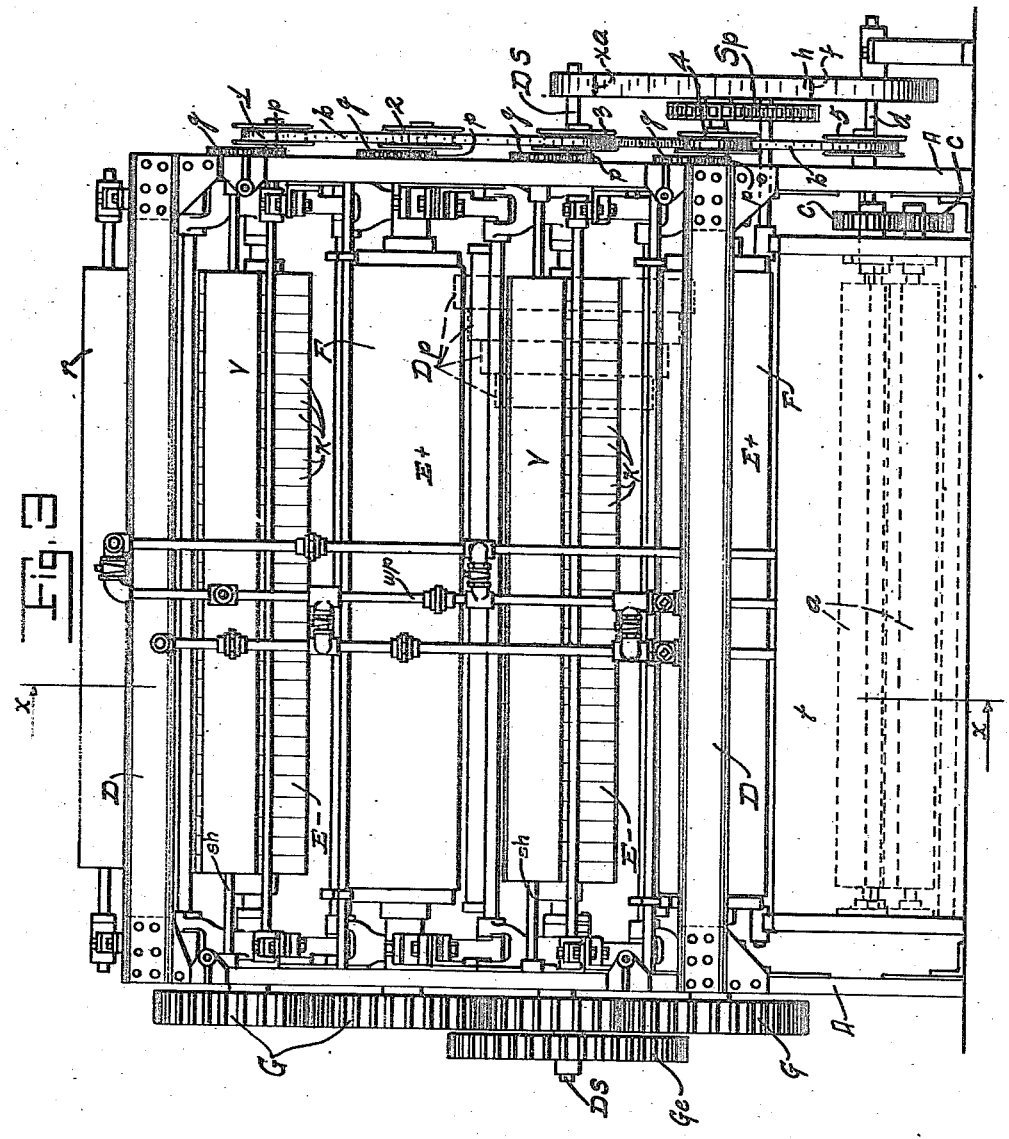

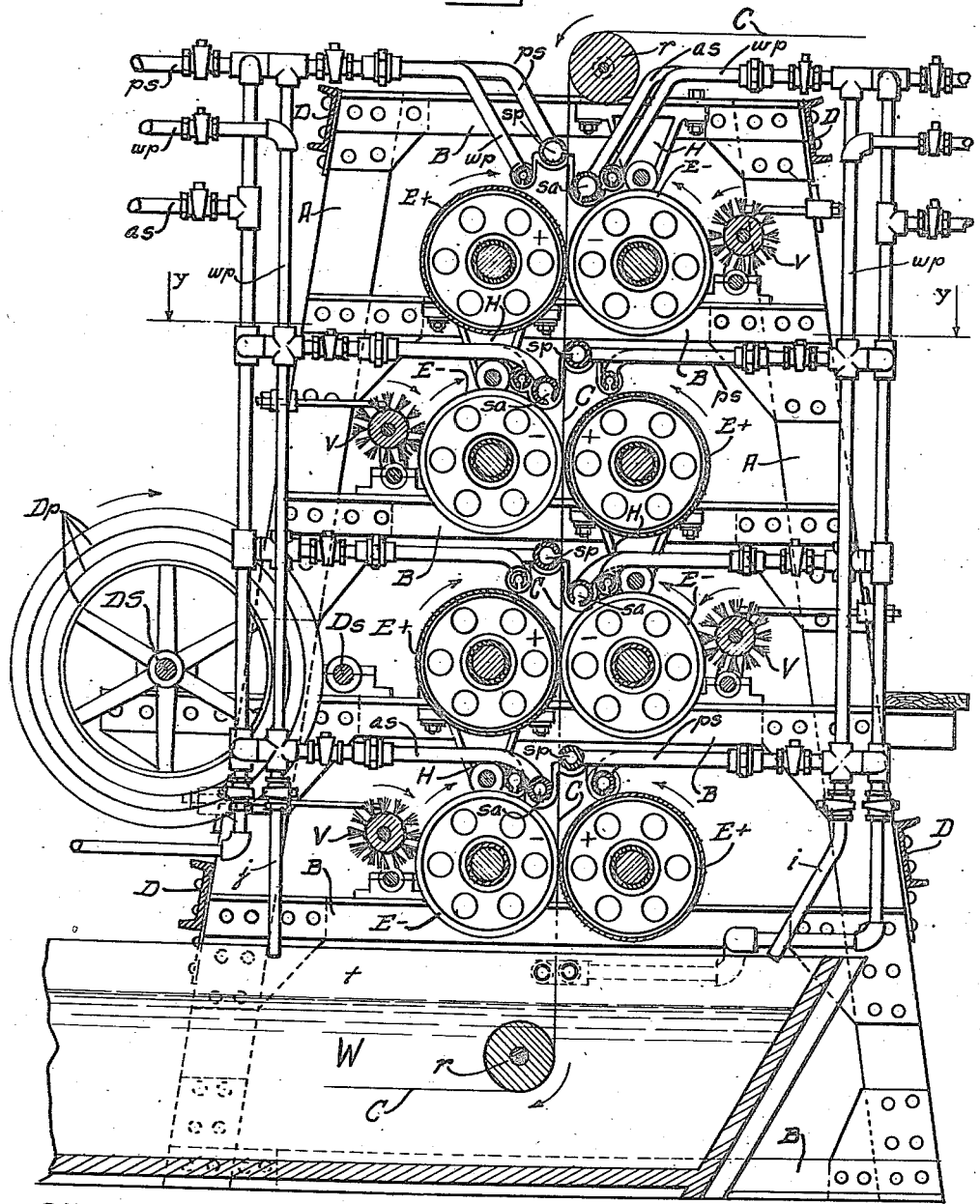

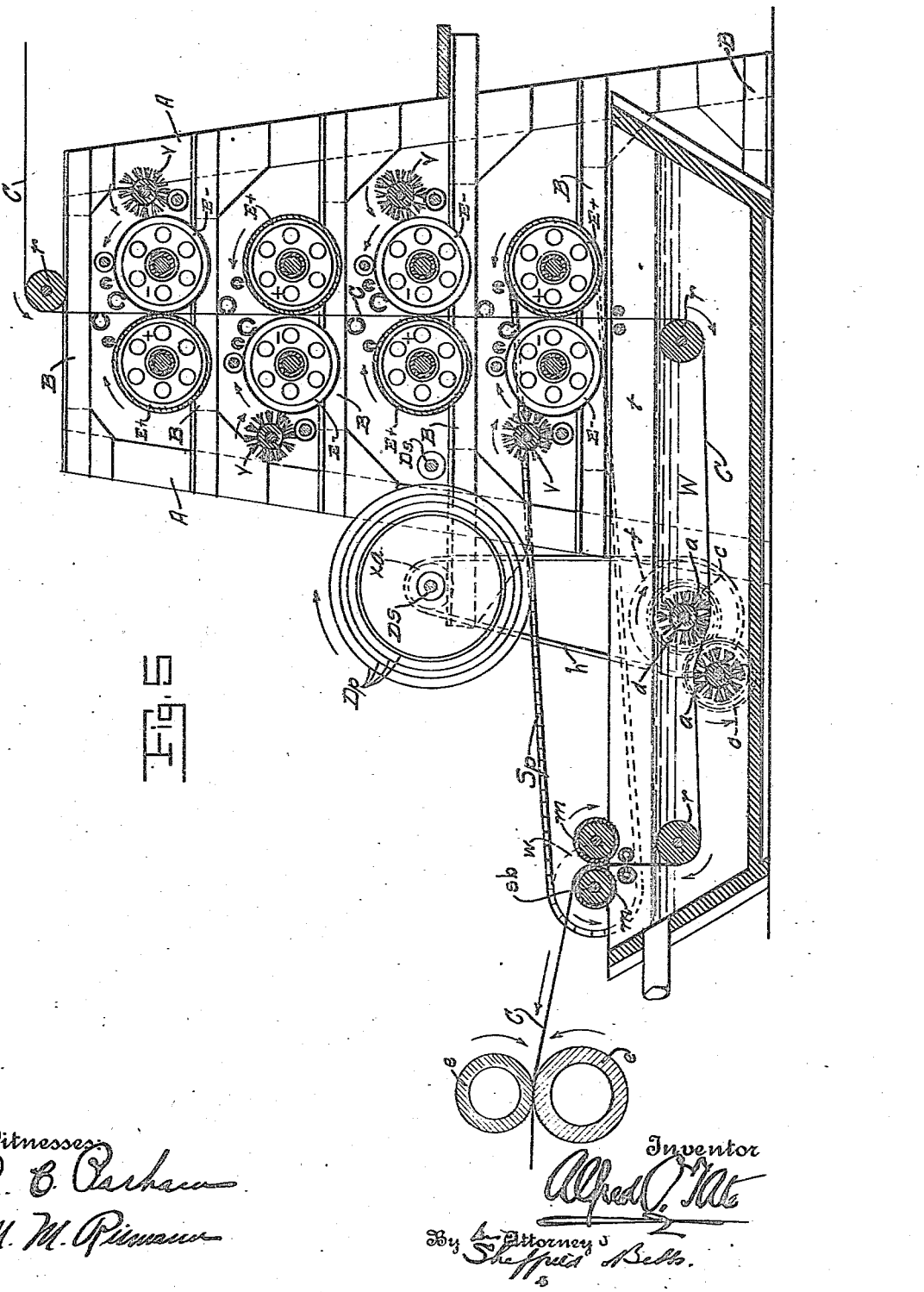

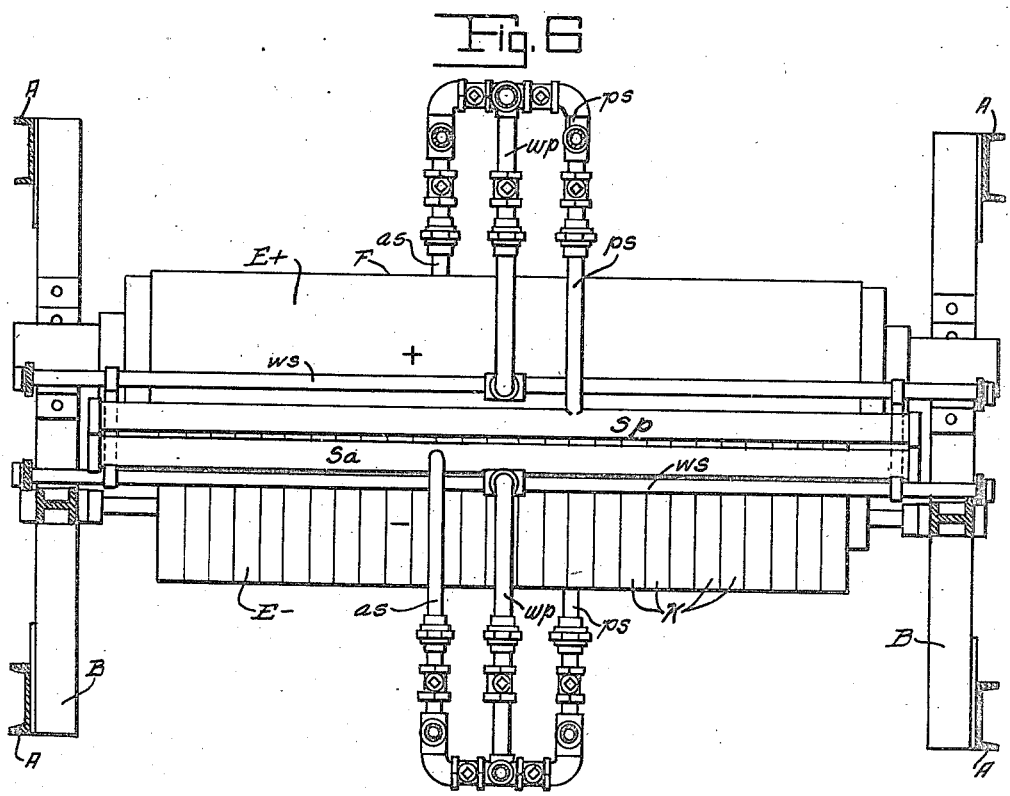
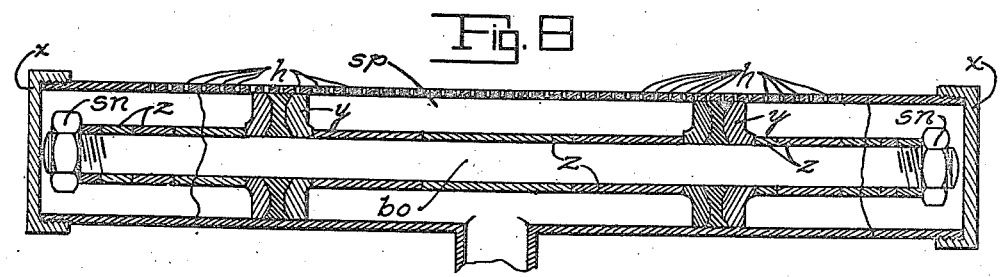
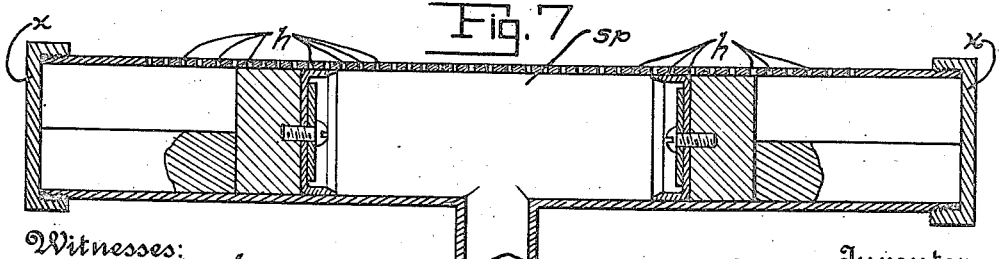

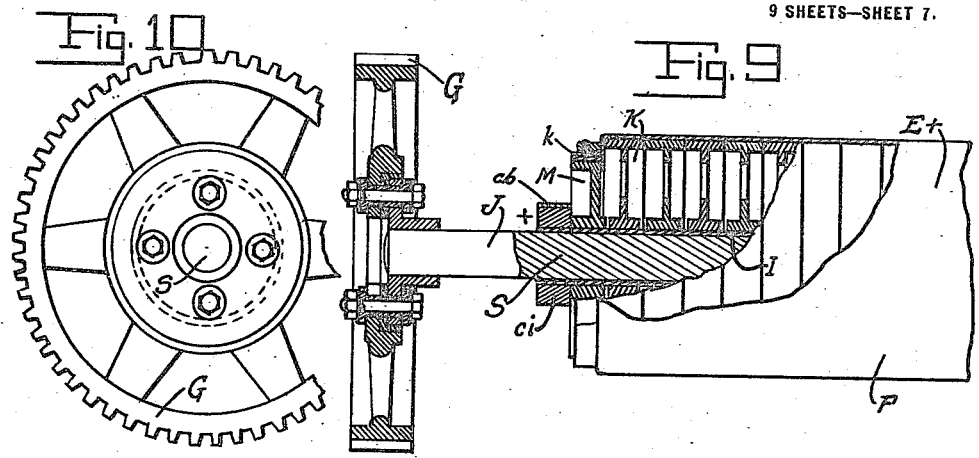
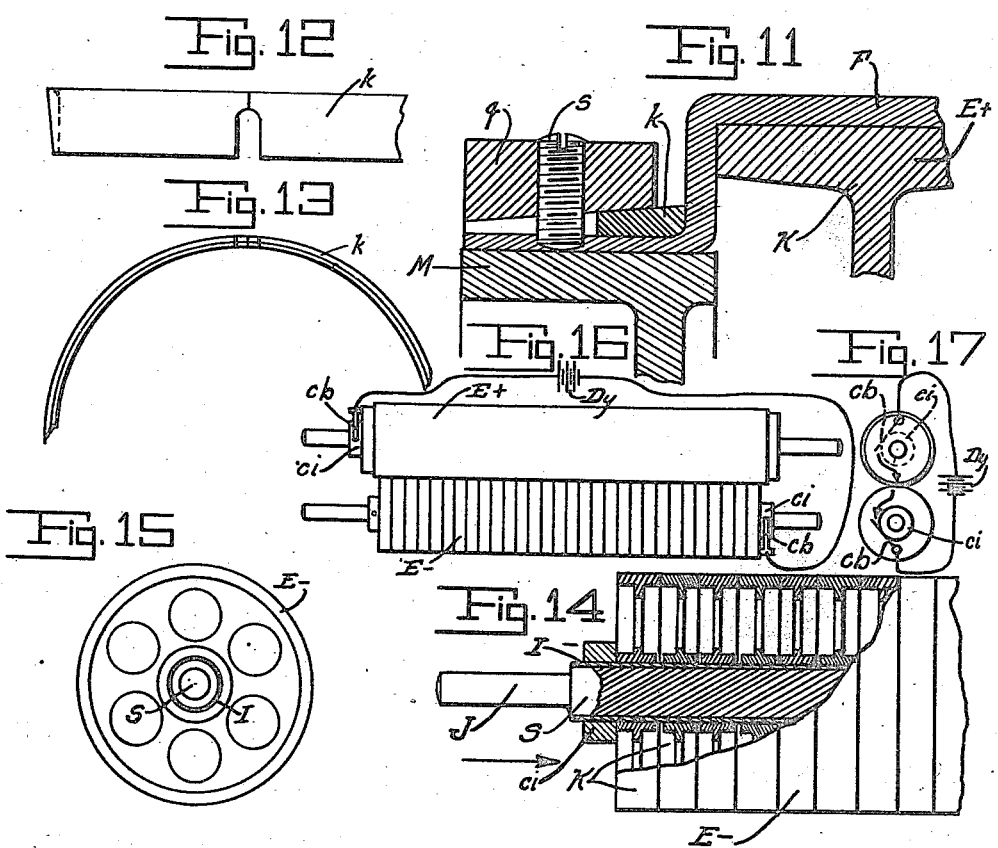

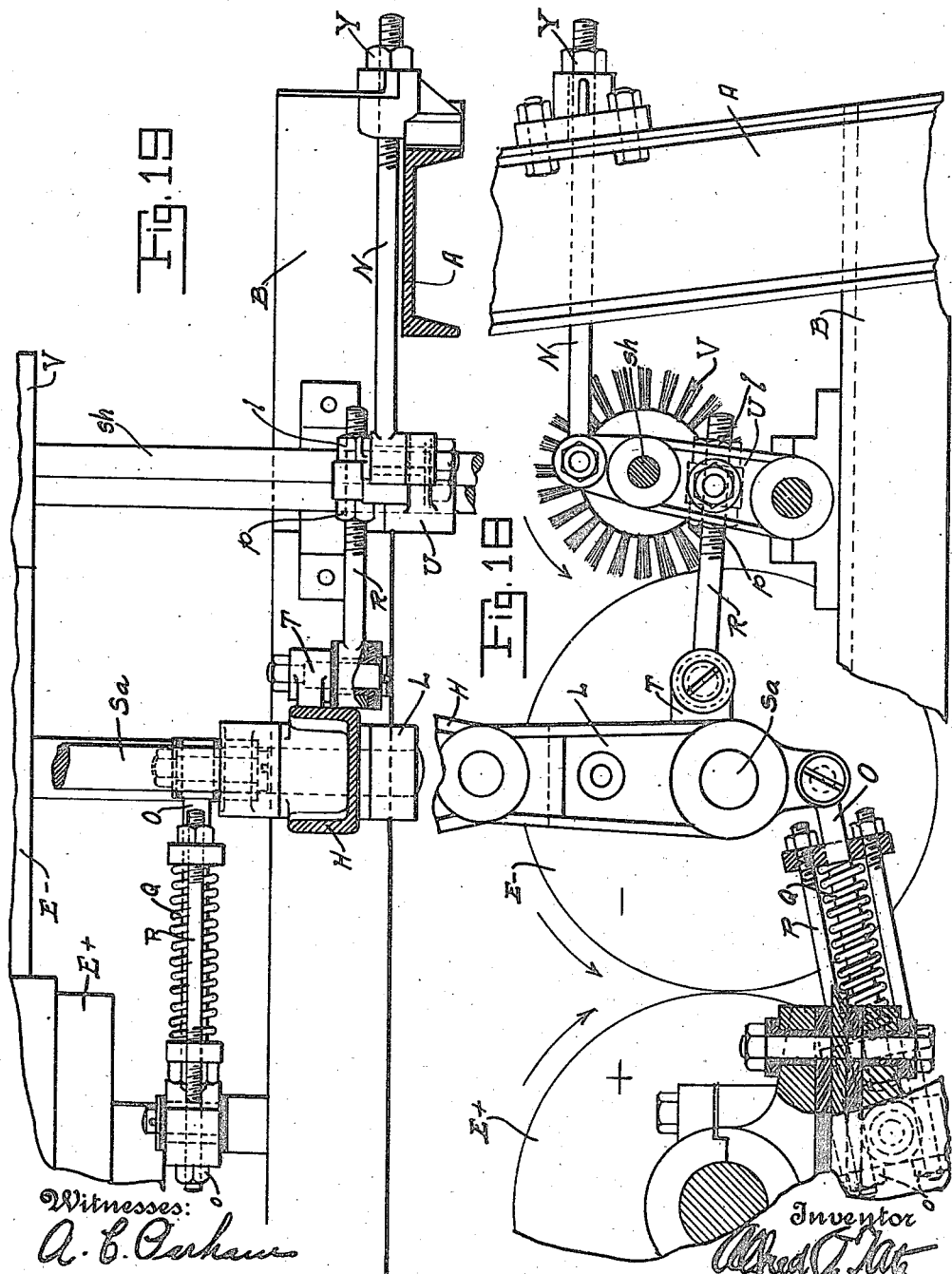

UNITED STATES PATENT OFFICE.

ALFRED O. TATE, OF MONTREAL, QUEBEC, CANADA, ASSIGNOR TO TATE ELECTROLYTIC WATERPROOFING COMPANY, INCORPORATED, OF NEW YORK, N. Y., A CORPORATION OF NEW YORK.

MACHINE FOR WATERPROOFING FIBROUS MATERIALS.

1,215,077.  Specification of Letters Patent.  Patented Feb. 6, 1917.

Application filed February 20, 1915. Serial No. 9,637.

*To all whom it may concern:*

Be it known that I, ALFRED O. TATE, a subject of the King of Great Britain, and a resident of Montreal, Province of Quebec, Canada, have invented a certain new and useful Machine for Waterproofing Fibrous Materials, of which the following is a specification.

My invention is directed broadly to a machine for producing waterproofed paper, textile fabrics or the threads thereof, or, in fact, any fibrous material capable of absorbing moisture due to capillary action, by making the same non-absorbent or non-capillary. And to this end it consists in mechanism for producing the products resulting from the methods or processes disclosed in a prior patent granted to me on the 14th day of Sept., 1909, and numbered 933,861, and a prior application filed by me on the 31st day of December, 1914, and numbered 879,871, in which is described and claimed a product made the subject-matter of a third application filed on the 31st day of December, 1914, and numbered 879,872. To this end, my invention has for its objects:

First: To so effectually treat fibrous materials that they are made practically non-absorbent or without capillary action in the presence of moisture and may be utilized generally in the arts wherever there is a commercial requirement for such products.

Second: To effectually render materials of this nature non-capillary by treating them upon one or both sides with a non-absorptive agent or agents during the time that the material is passing through the machine.

Third: To effect such treatment simultaneously and continuously on opposite sides of the material while it is passing through the machine.

Fourth: To provide means whereby electrolyzing liquids may be applied or sprayed upon both sides of the material being treated at the same time and then subjected to the action of electrolysis.

Fifth: To provide means whereby the material may be subjected to the action of electrolyzing liquids and electrolysis on opposite sides as it passes through the machine and is subsequently subjected to the action of water supplied at various points throughout the machine for cleansing both the material and the parts of the machine which act thereon.

Sixth: To provide a machine of this nature with pairs of electrodes, which are so designed that they produce different electrolyzing effects upon the material being treated as it passes between the same.

Seventh: To provide such a machine with cylindrical electrodes, which are rotatable and have means of adjustment for treating materials of various thicknesses.

Eighth: To provide means whereby the entire machine may be subjected to the flushing action of water and to combine therewith brushes which thoroughly cleanse and scrub the negative electrodes and also the material being treated after it has passed therethrough.

Ninth: To provide a machine of this nature with an absorbent pad for one or more of the electrodes, which pad aids in the electro-mechanical action had during the operation of the machine.

Tenth: To provide means for detachably securing the absorbent pads to the positive electrode in such manner that they will present an even, relatively constant, electrical resisting surface when saturated to the electrolyzing current passing therethrough.

Eleventh: To provide means for spraying the material and attachments therefor which enable the width of the material treated to be of various dimensions.

Twelfth: To provide means for adjustably securing the absorbent pads about the surfaces of all of the positive electrodes so as to give the best possible results in the electrolytic action therethrough.

Thirteenth: To provide a machine of this nature with a source of electrical energy connected in circuit with means for varying the electrical conditions of the circuit in accordance with the necessities of the work to be done, and additional means for varying the conditions of the electrodes in accordance with such work, together with measuring devices and rheostats for determining the voltage and amperage of the current used under any required condition.

Fourteenth: To produce a machine which will act upon metallic electrodes, preferably aluminum, in such manner as to produce and deposit throughout the material being treated substances which prevent capillary action.

Fifteenth: To provide a machine of this nature with the several details of construction hereinafter pointed out during the description, whereby fibrous materials, generally, such as paper, leather fabrics, cloths or the threads thereof may be rendered non-absorbent or non-capillary and thus waterproofed.

For a full and clear understanding of my invention, such as will enable others skilled in the art of waterproofing fibrous materials to construct and use the same, reference is had to the accompanying drawings, in which like letters of reference and like numerals represent like or equivalent parts, and wherein:

Figure 1 is an end elevational view thereof as seen with its base properly secured to the floor of a building and Fig. 2 is a like elevational view thereof as seen looking at the same in an obverse direction.

Fig. 3 is a side elevational view on a smaller scale and as seen looking at Fig. 1 from right to left in the direction of the arrows on the right of that figure.

Fig. 4 is a vertical, sectional view upon the same scale as Figs. 1 and 2, taken on line x—x, Fig. 3, and as seen looking thereat from left to right in the direction of the arrows upon that figure.

Fig. 5 is a similar sectional view upon the same line, as seen looking at Fig. 3 and in the same direction, showing the arrangement of the parts where the material being treated is finally passing from the machine on the left and omitting the fluid pipes seen in Fig. 4 to avoid confusion.

Fig. 6 is a sectional view taken through Fig. 4 on the line y—y and as seen looking at that figure in the direction of the arrows thereon from the top toward the bottom of the drawing.

Fig. 7 is an enlarged, detail, sectional view of one of the spraying tubes, showing the internal means for making the same adjustable with relation to the width of the goods that is to be treated and Fig. 8 is a similar view of a modified form thereof.

Fig. 9 is an enlarged, broken, sectional view of part of one of the positive electrodes or electrode surfaces and its surrounding porous pad, together with means in the nature of a gear-wheel for continuously rotating said parts.

Fig. 10 is an end elevational view of Fig. 9, as seen looking thereat from left to right.

Fig. 11 is an enlarged, detail, sectional view of a part of one of the positive electrodes or electrode surfaces, together with its surrounding porous pad, showing also the means of securing the same thereto.

Fig. 12 is a detail, plan view and Fig. 13 a detail, side, elevational view of a part of the means for clasping the porous pad securely in place about the positive electrodes.

Fig. 14 is an elevational view, shown partly in broken section, of one of the negative or minus electrodes illustrating also the shaft and journal-bearing upon which it rotates, together with the conducting-ring for the negative brush of the source of electrical energy.

Fig. 15 is an end elevation of Fig. 14, as seen looking from left to right in the direction of the arrow.

Fig. 16 is a side elevational view on a diminished scale of a pair of the electrodes illustrating also their connection with the source of electrical energy, showing also the porous pad around the positive electrode, and Fig. 17 is an end view thereof as seen looking at Fig. 16 from right to left.

Fig. 18 is an enlarged, side, elevational view illustrating the manner of pivotally securing the negative electrodes to the frame of the machine and so adjusting the rotary cleaning brushes with relation to the surfaces of the said electrodes.

Fig. 19 is a part plan, part sectional view of Fig. 18, as seen looking thereat from the top toward the bottom of the drawings.

Figs. 20 and 21 are diagrammatic views illustrating a source of electrical energy, as a dynamo-electric machine, a rheostat and electrical measuring instruments, switches, lamps, etc., used with the machine and arranged in such manner as to enable an attendant to determine the electrical operation effected by the current through the electrodes at any time.

In my aforementioned applications, a novel product and a novel process of making the same is effected by subjecting fibrous material, in the nature of cloth or analogous woven products, to the saturation upon one side of an electrolytic fluid of a saponaceous nature, the saponaceous material being preferably a liquid solution of palmate of sodium; and, upon the other, to a solution of aluminum sulfate and then treating the same through electrode surfaces to the action of electrolysis, the electrode surfaces consisting of a conductor or electrode of aluminum, whereby, through electrolytic action, a metallic sulfate and a metallic hydroxid are introduced into the material being treated, thus effectually rendering it non-absorbent or non-capillary. I shall, therefore, describe hereinafter an apparatus specifically devised to practice this particular method or process and produce the product described and claimed in one of the above applications, No. 879,871, although I wish it distinctly understood that many of the features of my novel mechanism hereinafter disclosed and illustrated in the accompanying drawings are capable of use generally in the art of making or producing non-absorbent, porous fabrics.

Referring now to the drawings in detail, A represents the vertical parts of the frame of the machine, the same being preferably strong beams or timbers inclined toward each other from the bottom toward the top and having a number of equally strong, horizontal cross-beams B, etc., securely bolted or fastened thereto at their ends and on different levels for the purpose of supporting the various operative parts; angle-irons being provided for properly bracing and counter-bracing the aforesaid parts, as shown. Corresponding cross-beams D are secured to the outside and at opposite ends of the frame. E+ and E—, taken in pairs, are cylindrical electrode surfaces or rolls, there being shown four such pairs, one above the other. These electrodes are shown in detail in Figs. 9 to 17, inclusive, and are made preferably of a plurality of metallic disks K, of aluminum, and threaded together upon good conducting-sleeves I, as of copper, which, in turn, are secured upon rotary shafts S, having journals J at their opposite ends for journaling the E+ electrodes in journal-bearings J B. These disks are insulated from each other with insulating paint in order to effect a more uniform current distribution between the opposing electrodes E+ and E—, but they may be in contact if desired. They are all held together in firm contact upon the conducting-sleeves I, by collars M, at their opposite ends, which collars are secured to the shaft by set-screws not shown. F is a pad of comparatively thick, porous material designed to hold the electrolytic material in suspension against the positive electrode E+ and is so constructed, as shown in enlarged, detail view, Fig. 11, that it may be held upon this electrode by inclined parts of a sectional clamping-ring $k$, having transverse slots at preferably 120 degrees apart and corresponding, inclined, binding parts of a complete ring $q$, secured, when adjusted, in position by three screws $s$. At the alternate ends of each pair of plus and minus electrodes, against the collars M and upon the copper or equivalent conducting-sleeve I, are secured contacting-rings $ci$, see also Figs. 16 and 17, which act as conductors to the corresponding E+ and E— electrode surfaces for the contacting-brushes $cb$. G represents four intergeared driving-wheels for the E+ electrodes. These gear-wheels for the E+ electrodes are all insulated from the shafts S, etc., thereof, as clearly shown, the bolts and nuts being also carefully insulated as illustrated on the left of Fig. 9 and in Fig. 10. The opposite ends of the shafting S, supporting the several negative or E— electrodes or electrode surfaces, are all journaled in the lower ends of relatively-strong, pivoted links L, see Figs. 1, 2, 18 and 19, which illustrate the several features of this part of the invention in detail. The links L are in turn pivotally supported by hangers H, secured to the underside of the different horizontal cross-beams E; and in parallelism with the shafting S of the E+ electrode rolls, so that they may be rocked either toward or from said rolls, thus rendering them adjustable with relation to the space required between them for the material being treated. The lower ends of these links are pivotally connected to adjusting-arms O, at opposite ends of the shafting $Sa$, which carry the E— rolls, and slidably connected at their free ends but insulated from the frame of the machine, as shown on the left of Fig. 18, for the purpose of avoiding short-circuiting between the poles of the source of electrical energy. Adjustment is effected by bolts P, nuts $o$, and compressible springs Q, Fig. 19, the normal tendency of said parts being to hold the surfaces of the rotating electrodes E+ and E— toward each other compressibly so that the rolls E— are continuously frictionally rotated by the E+ rolls. Adjusting-rods R, are pivotally connected to the shafts $Sa$, of the E— electrodes through lugs T on the lower end of the links L, and these rods R are screw-threaded at their free ends and provided each with two screw-nuts $l$, $p$, adjustably connected by lugs or extensions upon pivoted arms U, journaled at their lower ends to the horizontal cross-beams B. To these pivoted arms U are journaled, on shafting $sh$, rotary scrubbing-brushes V for the E— electrodes, and the upper ends of the pivoted arms U are provided with pivotally connected adjusting-rods N, the free ends of which extend to brackets on the uprights of the frame A, adjustment being effected by adjusting-nuts Y.

Referring again to Fig. 2 of the drawings, I will describe the means for rotatably driving these scrubbing-brushes V, so as to clean the negative electrode rolls or surfaces, consisting of four pulleys 1, 2, 3 and 4, journaled at the end of the frame, and on the four shafts $sh$, Fig. 3, with four pinions $p$, intermeshing with four gear-wheels $g$, 5 and 6 being idle-pulleys, or pulleys for changing the direction of the belt $b$, and all of the aforesaid pulleys are located in alinement with the driving pulley DR, Fig. 2, on the main shaft DS. On said shaft is step pulley $Dp$, for driving the machine. The four gear-wheels $g$ are adapted to directly drive the four scrubbing-brushes V, on the shafting $sh$ for said brushes, in the same direction as that of the corresponding electrode rolls E—, as will be obvious on inspection of Figs. 2, 3, 5 and 18, and these four brushes are all made adjustable with relation to the negative electrode rolls by the structural devices heretofore described and specifically illustrated in Figs. 18 and 19, whereby a simultaneous adjustment of these rolls and the proper pressure of the same upon the material, according to the thickness thereof, is also obtained, as will be obvious on inspection of Fig. 18. $t$ represents a tank or vessel at the bottom of the machine standing upon the floor for receiving the liquid that escapes during the operation and also for holding a supply of cleansing liquid. C, Figs. 4 and 5, represents the material under treatment as it is being fed through the machine in the direction of the arrows between the pairs of E+ and E− electrodes. $r$ represents guiding-rolls, one journaled at the top of the machine, see Fig. 5, and two journaled in the tank $t$, the surfaces of the first two being located in alinement with each other and with the adjacent surfaces of the contacting-electrodes, and the other roll $r$, on the left, being situated in the distant portion of the tank, these rolls being of a length substantially equal to that of the electrode-rolls E+ and E−, as illustrated in Fig. 3, and acting as guides and feeders of the material. Scrubbing-brushes $a$, Figs. 3 and 5, are geared together by gear-wheels $c$, at the sides of the tank $t$, and operatively connected together through a shaft $d$ and pulley $f$ by a driving-belt $h$, which is connected in turn to a pulley $xa$, upon the end of the main driving-shaft DS, see Figs. 3 and 5, the function of these parts being to effectually scrub the material beneath the water W in the tank $t$. $Sp$, is a sprocket-chain operatively connecting through sprocket-wheels $w$ on the shaft $sb$, of a pair of intergeared wringers $m$ for the purpose of partially drying the material as it passes out of the machine. $e$ and $e$ are tubular mangles, which are heated by steam or in any preferred way, used to finally dry and deliver the material after its completed treatment makes it ready for use.

I will now describe the means for feeding water and the electrolytic agents to the material being treated.

Referring particularly to Fig. 6, it will be seen that water-pipes $wp$, are attached at right-angles to the center of spray-pipes $ws$, above the E+ and E− electrodes, the spray-holes $h$ being located on the underside thereof, reference also being had to Figs. 4, 7 and 8. It will be noted that water will flow, from a source of supply not shown, continuously in the nature of a spray upon the surface of the electrodes and that, similarly, the pipes $ps$, on both sides of the machine, will convey to the spray-pipe $sp$, a spray of the solution which, on examination of Fig. 4, it will be apparent sprays the fabric. Likewise, the solution from the pipe $as$, enters the spray-pipe on the opposite side and is caused to be injected forcibly into a pocket between the material being treated and the E− electrode surface. The various pipes $wp$, $as$, and $ps$, are so connected together, as will be noted on examination of Fig. 4, that, on the admission of the treating fluids, the operation is reversed successively; that is to say, the action in the second instance will be a direct spraying on the material to be treated from left to right and a pocketing action between such material on the other side and the negative electrode, and so on alternately through all four electrode surfaces, the spraying action of the water being alike for all the electrode surfaces. These several pipes are connected together as shown and are also provided with a plurality of operating cocks, as illustrated in the drawings, whereby the relative value of the solutions may be varied for any one of the electrode surfaces or all at will, and the feed of the water to every part of the machine may be likewise varied at will in quantity and direction of flow. It will be noted that the water is conveyed by pipes $wp$ to spraying-tubes near the top of the vessel $t$, at both ends, so as to continue the cleansing action as the material being treated advances. The arrangement of the several pipes and cocks is such, also, that any or all of the pipes or spraying-tubes may be flushed at any time. In fact, by reason of outlet-pipes $i$ and $j$, at the opposite ends of the machine, the entire system may be flushed.

Referring now to Figs. 7 and 8, I will describe the spray-tube, used with the electrodes, it being shown in large sectional view in those figures. $sp$, is a spray-tube proper and is provided with one or more rows of spray-holes $h$, said tube having screw-caps $x$ for closing both ends. $y$ constitutes expansible or flexible disks of rubber, and a series of tubes located within the spraying-tube and adapted to be adjusted endwise upon a bolt $bo$, provided at its opposite ends with screw-nuts $sn$, for expanding the flexible rings, the same being rendered adjustable by virtue of the bolt $bo$, and adapted to be threaded thereon at various positions within the spray-tube $sp$, thus making it possible to vary the effective length of the spraying-tube at will, so as to adapt it for different widths of material to be treated. The liquid supply for these tubes enters the spray-tube at the center thereof, as clearly shown. In Fig. 7 I have shown a modified form of the spraying-tube, in which there are used two sliding-cups adapted to be adjusted back and forth between the screw-heads $x$ by inserting different lengths of adjusting-devices, as will be understood on inspection of the drawings.

Figs. 20 and 21 of the drawings illustrate the manner of connecting up the source of electrical energy which supplies the machine with electricity, in accordance with the necessities of the case. In Fig. 20 I have illustrated how the source of electrical energy may be so connected to the machine that the amperage and voltage in all of the electrodes may be determined at any time. All are shown in series in that figure. In Fig. 21 I have illustrated a different manner of connecting the source of electrical energy to the machine in various ways, so as to ascertain the amperage and voltage when the electrodes are connected in any preferred manner. As to the amperage and voltage, it is desired to utilize any of the electrodes, which may be connected in any preferred arrangement, it being simply necessary for the attendant to regulate the circuit from the generator or source of electrical energy $Dy$, and the various hand-switches $hs$, shown. $Am$, represents the ammeter and $Vm$, the voltage meter, in both figures of the drawings. $Sw$, represents the switches and $Rheo$. the rheostats for varying the resistances to the current flowing in accordance with the wishes of the attendant, these features being mere matters relating to the application of electrical energy in a well-known way, and not necessary of fuller description here.

The operation of the invention, in view of the foregoing description, will be obvious, it being understood that the material $C$ to be treated is fed into the machine from a bolt thereof, as seen looking at Fig. 1, the same passing from right to left over the roll $r$, between the successive pairs of $E+$ and $E-$ electrodes, and is electrolytically treated simultaneously and successively on both sides by electrolytic agents which make the material non-absorbent or non-capillary, water also being used on both sides thereof at the same time to freely cleanse the $E+$ and $E-$ electrodes, both of which acts are successively done as the material proceeds from one pair of electrodes to another, and as it passes downward, see Fig. 5, and to the left, it is subjected to further cleansing action on opposite sides at the top of the tank $t$, and then passes through the water in that tank and is scrubbed by the scrubbing-brushes $a, a$, after which it passes to the left and upward, where it is again subjected to a cleansing action by a spraying of the water on opposite sides. It is then subjected to pressure in the wringers $m, m$, and finally to the drawing and dressing action of the mangles $e, e$, shown on the left of Fig. 5. It is also apparent that a variable condition of the treating liquids may be effected by varying the proportional dilution of the flow thereof with the water to the supply tubes shown in Figs. 3, 4, 6, 7 and 8, and also that the machine may be absolutely cleansed throughout, or in any of its parts, but properly opening and closing the various water-cocks to the water-supply in any desired order.

I do not limit my invention to the specific details of construction illustrated in the drawings, and hereinbefore described, as many of the features of the invention may be materially departed from and still come within the scope of my claims hereinafter made.

Having thus described my invention, what I claim and desire to secure by Letters Patent of the United States is:

1. A machine for making fibrous materials non-absorbent embracing one or more pairs of electrodes through which the material is adapted to be advanced, in combination with means for applying an electrolytic agent on opposite sides of the material being treated as it is being advanced therethrough.

2. A machine for making fibrous materials non-absorbent embracing a plurality of electrodes through which the material is adapted to be advanced, in combination with means for subjecting the material to a different electrolytic agent on each side thereof, while it is being advanced therethrough.

3. A machine for making fibrous materials non-absorbent embracing a plurality of pairs of electrodes through which the material is adapted to be advanced, and a source of electrical energy having its opposing poles successively connected thereto in alternating order, together with means for subjecting the material to a different electrolytic agent on each side as it is successively advanced between the pairs of electrodes.

4. A machine for making fibrous materials non-absorbent, embracing a plurality of pairs of electrodes through which the material is adapted to be advanced, and a source of electrical energy having its opposing poles successively connected thereto in alternate order, together with means adjacent each pair of electrodes for applying an electrolytic agent to the material prior to its passage therethrough.

5. A machine for making fibrous materials non-absorbent embracing a plurality of pairs of electrodes, and a source of electrical energy having its opposing poles successively connected thereto in alternate order, together with means for simultaneously and successively subjecting the material on opposite sides to electrolytic agents.

6. A machine for waterproofing fibrous materials embracing one or more pairs of electrodes through which the material is adapted to be advanced, combined with means for spraying the material with one or more electrolytic agents as it is advanced therethrough, together with a source of electrical energy having its poles connected to the opposite ends of said electrodes.

7. A machine for making fibrous materials non-absorbent embracing pairs of electrodes through which the material is adapted to be advanced, combined with means for spraying the material with one or more electrolytic agents as it is advanced therethrough, together with a source of electrical energy, and connections therefrom for varying the direction of current flow through the successive pairs of electrodes.

8. A machine for making fibrous materials non-absorbent embracing pairs of electrodes through which the material is adapted to be advanced, combined with means for spraying the material with one or more electrolytic agents, and additional means for spraying the same with water, as it is advanced therethrough.

9. A machine for making fibrous materials non-absorbent embracing one or more pairs of electrodes, in combination with a source of electrical energy having its opposite poles connected respectively to the two electrodes of each pair, and means for supplying one or more electrolytic agents to the surfaces of the electrodes, together with one or more porous or absorbent pads covering the surface or surfaces of the positive electrodes.

10. A machine for making fibrous materials non-absorbent embracing one or more pairs of electrodes through which the material is adapted to be advanced, together with means for spraying both surfaces of the material as it is advanced therethrough, and additional means for subjecting the same, as it is continuously advanced, to the action of water.

11. A machine for making fibrous materials non-absorbent embracing one or more pairs of electrodes through which the material is adapted to be advanced, together with means for spraying both surfaces of the material as it is advanced therethrough, and additional means for subjecting the same, as it is continuously advanced successively, to a cleansing and scrubbing action.

12. A machine for making fibrous materials non-absorbent embracing one or more pairs of electrodes through which the material is adapted to be advanced, together with means for spraying both surfaces of the material as it is advanced therethrough, means for subjecting the same to the action of water, additional means for scrubbing and cleaning the material as it is farther advanced, and, finally, means for drying the same as it passes out of the machine.

13. A machine for making fibrous materials non-absorbent embracing one or more pairs of electrodes, in combination with a source of electrical energy having its opposite poles connected respectively to the two electrodes of each pair, and means for subjecting the surfaces to the moistening action of electrolytic agents as the same is advanced, together with means in the nature of a porous pad for accumulating and distributing said agents.

14. In a machine for making fibrous materials non-absorbent, an electrode, in combination with means in the nature of a spraying-tube for spraying a treating electrolyte upon the surface thereof, together with adjustable means for varying the effective length of the spraying-tube in accordance with the width of the material to be treated.

15. In a machine for making fibrous materials non-absorbent, an electrode, in combination with means in the nature of a hollow, perforated tube for spraying a treating electrolyte upon the surface thereof, and internally located means for varying the longitudinal application of the treating liquid upon the surface of the material being treated.

16. A machine for making fibrous materials non-absorbent embracing one or more pairs of electrodes, a source of electrical energy having its opposite poles connected respectively to the two electrodes of each pair, means for advancing the material to be treated between the electrodes, means for spraying opposite sides of said material as it is advanced, means for varying the application of such source of electrical energy in accordance with the requirements of the material being treated, and means for indicating the voltage and amperage of the electrical energy so applied.

17. In a machine for making fibrous material non-absorbent, one or more pairs of electrodes through which the material is adapted to be advanced, in combination with a source of electrical energy having its opposite poles connected respectively to the two electrodes of each pair, one or more sources of liquid supply containing materials for the treatment of the material, and means connected with said sources of supply for applying it to the opposite surfaces of the material as it passes through the machine.

18. In a machine for making fibrous materials non-absorbent, one or more pairs of electrodes through which the material is adapted to be advanced, in combination with a source of electrical energy having its opposite poles connected respectively to the two electrodes of each pair, one or more sources of liquid supply containing materials for the treatment of the material to be acted upon, and means connected with said sources of supply for applying it to the opposite surfaces of the material as it passes through the machine, together with means for flushing and cleaning the entire machine as is demanded.

19. A machine for treating fibrous materials so as to make them non-absorbent, embracing one or more pairs of cylindrical electrodes or rolls, in combination with a source of electrical energy having its opposite poles connected respectively to the two electrodes of each pair, and means for continuously rotating said electrodes toward each other.

20. A machine for treating fibrous materials so as to make them non-absorbent, embracing a plurality of cylindrical electrodes, means for continuously rotating the same toward each other, means for conveying electrolytic liquids on opposite sides of the material, and a source of electrical energy having its opposite poles connected respectively to said electrodes, together with rotatable means for directing the material to and through the machine, and similar rotatable means for conveying the finished product out of the machine.

21. A machine for treating fibrous materials so as to make them non-absorbent, embracing a plurality of pairs of rotatable electrodes, interconnecting gearing for driving the surfaces of said pairs of electrodes toward each other, and means for feeding electrolytic liquids to opposite sides of the material being treated as it passes through the machine, together with a source of electrical energy having its opposite poles connected respectively to the two electrodes of each pair.

22. A machine for treating fibrous materials so as to render them non-absorbent, embracing a plurality of pairs of cylindrical electrodes, interconnecting gearing for driving the surfaces of said pairs of electrodes toward each other, means for adjusting the distance between the electrodes in accordance with the thickness of the material being treated, and a source of electrical energy operatively connected to each of said pairs of electrodes, together with means for feeding electrolytic liquids upon the surfaces of the electrodes and additional means for applying electrolytic liquids to opposite sides of the material as it passes through said electrodes.

23. A machine for treating fibrous materials so as to render them non-absorbent, embracing a plurality of pairs of rotatable electrodes, and intermeshing gearing operatively connected to the positive electrodes for driving them, means located above each pair of electrodes for feeding electrolytic liquids on opposite sides of the material to be treated, and additional means for feeding water to the surfaces of all of the electrodes, said means being adapted to carry the liquids successively to opposite sides of the material and above the successive pairs of electrodes, together with a source of electrical energy provided with means for reversing the polarity of current which flows to the electrodes in sequence.

24. A machine for treating fibrous materials so as to render them non-absorbent, embracing a plurality of cylindrical electrodes, one of which is provided with a surface pad of porous or absorbent material and a source of electrical energy having its opposite poles connected respectively to two adjacent electrodes.

25. In a machine for treating fibrous materials so as to render them non-absorbent, a cylindrical electrode having a continuous surface and composed of a plurality of metallic disks threaded upon a sleeve of good conducting material and having their outer or surface edges insulated from each other.

26. In a machine for treating fibrous materials so as to render them non-absorbent, a cylindrical electrode composed of metallic disks threaded upon a sleeve of good conducting material and having their adjacent outer surfaces only in contact with each other, together with a surrounding porous pad and means at the opposite ends of the electrode for detachably securing the pad about the cylinder.

27. In a machine for making fibrous materials non-absorbent, one or more pairs of electrodes constructed of aluminum, in combination with a porous or absorptive pad covering the surface of the positive electrode or electrodes.

28. In a machine for making fibrous materials non-absorbent, embracing one or more electrodes of aluminum, and a porous or absorptive pad covering the surface of the positive electrode or electrodes, together with a source of electrical energy operatively connected to said electrodes.

In testimony whereof I have signed this specification in the presence of two subscribing witnesses.

ALFRED O. TATE.

Witnesses:
 WALTER S. JONES,
 JANE B. GRAHAM.